United States Patent

Cyphelly

[15] 3,685,842
[45] Aug. 22, 1972

[54] HYDROSTATIC SHAFT SEAL

[72] Inventor: Ivan Jaroslav Cyphelly, 8128 Hinteregg, Switzerland

[22] Filed: Oct. 9, 1970

[21] Appl. No.: 79,541

[30] Foreign Application Priority Data

Oct. 13, 1969  Switzerland............15331/69
Aug. 12, 1970  Switzerland............12116/70

[52] U.S. Cl. ....................277/74, 277/79, 277/83
[51] Int. Cl. ....................B65d 53/00, F16j 15/16
[58] Field of Search............................277/74, 83, 79

[56] References Cited

UNITED STATES PATENTS

| 3,093,382 | 6/1963 | Macks | 277/74 |
| 3,315,968 | 4/1967 | Hanlon | 277/74 |
| 3,527,464 | 9/1970 | Guinard | 277/74 |

*Primary Examiner*—Houston S. Bell, Jr.
*Attorney*—McGlew & Toren

[57] ABSTRACT

A hydrostatic shaft seal for a rotatable shaft extending through an opening in a housing includes a seal ring substantially enclosed in a seal ring casing seated in the housing opening, operating choke gaps being provided between opposite axial end surfaces of the seal ring and adjacent portions of the casing. One of these gaps is in communication with a space containing hydraulic operating fluid under pressure, and the other gap is in communication with a relatively low-pressure space. The two gaps are connected in series to open and close in opposition. The area of the axial end face of the seal ring facing toward the lower-pressure space is larger than the area of the axial end surface of the seal ring facing toward the space under operating hydraulic pressure. Elastic seal elements are provided between the seal ring and the shaft to provide for relative axial displacement of the seal ring under the oppositedly acting hydraulic pressures. The seal ring may be a single element or may be a two-part element, and the hydrostatic shaft seal may be designed for feeding through of a pressure medium from the housing to the shaft, with the space under operating hydraulic pressure being in communication with the shaft and the housing through pressure medium lines. Banjo-type feeding elements may be provided to reduce the diameter-dependent friction forces of the elastic seal means, and a further choke gap, serving as a pressure area limiting gap, may be provided in separated relation from an operating choke gap, the separation being formed by an annular slot-shaped pressure space.

6 Claims, 4 Drawing Figures

PATENTED AUG 22 1972

INVENTOR
IVAN JAROSLAV CYPHELLY

BY McGlew and Toren
ATTORNEYS

HYDROSTATIC SHAFT SEAL

BACKGROUND OF THE PRIOR ART

Prior to this invention, known hydrostatic shaft seals operated according to the principle of hydrostatic by-pass control. In such prior art seals, a part of the operating choke is by-passed by a shunt-connected choked secondary or control flow enabling a stable axial rest position for the secondary ring which rotates with the shaft and which forms the operating choke gap. The secondary (or control)flow can be conducted in the prior types by a choke line from the operating pressure region to pockets in the operating choke gap. Alternatively the secondary flow may be matched by modulation to the operating gap thickness, for example, by a conical or step-shaped design in the operating choke. If however, one pocket or a step profile is worn down by erosion or is merely damaged to a minor degree, the rotating seal ring is thereby caused to move into a new axial rest position in which the rotating seal comes into contact with the stationary parts beginning of processes non-rotating in the processes of the seal whereby the seal promptly becomes destroyed by friction and abrasion between the rotating and non-rotating parts.

SUMMARY OF THE INVENTION

This invention is directed to an improved floating seal for reducing abrasive contact of non-rotatable portions of the seal with opposite wear-susceptible rotatable surfaces of the shaft and rotatable members mounted on the shaft. In particular the present invention concerns a hydrostatic shaft seal, stressed by operating pressure, with a seal ring and operating choke gaps.

The present invention is directed to overcoming such typical problems of the prior art. Also, in particular, an object of this invention is to reduce the susceptibility of a hydrostatic seal to detrimental erosive wear of the seal geometry.

Another object of the invention is to provide a non-erosive floating-seal ring position between two opposing operating choke gaps with each choke gap operating to oppose its own closing and operating alternately with the opposite opposing choke gap.

Another object is to provide for the opposing choke gaps to be operating in substantially parallel planes.

Another object is a structure in which erosive wear does not substantially impair the continuing functioning of the respective opposing choke gaps.

Another object is a structure of simple design and/or simple assembling and/or low cost of production and/or maintenance.

Other objects of the invention become apparent from the preceding and following disclosure.

In accordance with the invention, a floating seal means comprises a movable seal ring at least partially enclosed by a casing, with the seal ring and the casing forming therebetween a first port in communication with a high-pressure fluid, and conduit structure extending from and in communication with the first port and extending to a space enclosed within the casing between a wall of the casing and a wall of large surface area of the seal ring. This space is in communication with a second port defined between the casing and the seal ring, and the second port is in communication with a low-pressure fluid. The wall having the large surface area is on that axial end face of the seal ring which faces the low pressure space. The opposite face of the seal ring has a surface area less than the large surface area. The first port is either within the opposite face or adjacent it.

More particularly, either the seal ring has an extension which is resilient for permitting movement in opposite directions or alternatively the seal ring rests on a mounted resilient member. In one preferred embodiment, the entire floating seal means is annular in shape, including the seal ring, the casing, and the resilient member, which may be termed the "isolating means", all being mountable around a shaft insertable through an opening in a housing, the sole fixed contact being between the annular isolating means mounted around the shaft and the seal ring mounted around the isolating means, whereby, when the shaft rotates, the isolating means and the seal ring also rotate with the rotating shaft. The spaces respectively in contact with the large surface area face and the smaller surface area opposite face of the seal ring, in conjunction with the alternatively opening and closing first and second ports, and in conjunction with the closing of the conduit whenever the seal ring moves to a predetermined degree in the opposite direction, results in a high-pressure fluid serving to cushion the seal ring at all times on opposite ends of movement as well as to return the seal ring to the cushioned position when it moves in either direction sufficiently to close the respective first port or opposite port.

DESCRIPTION OF THE PREFERRED EMBODIMENTS

Figure 1:
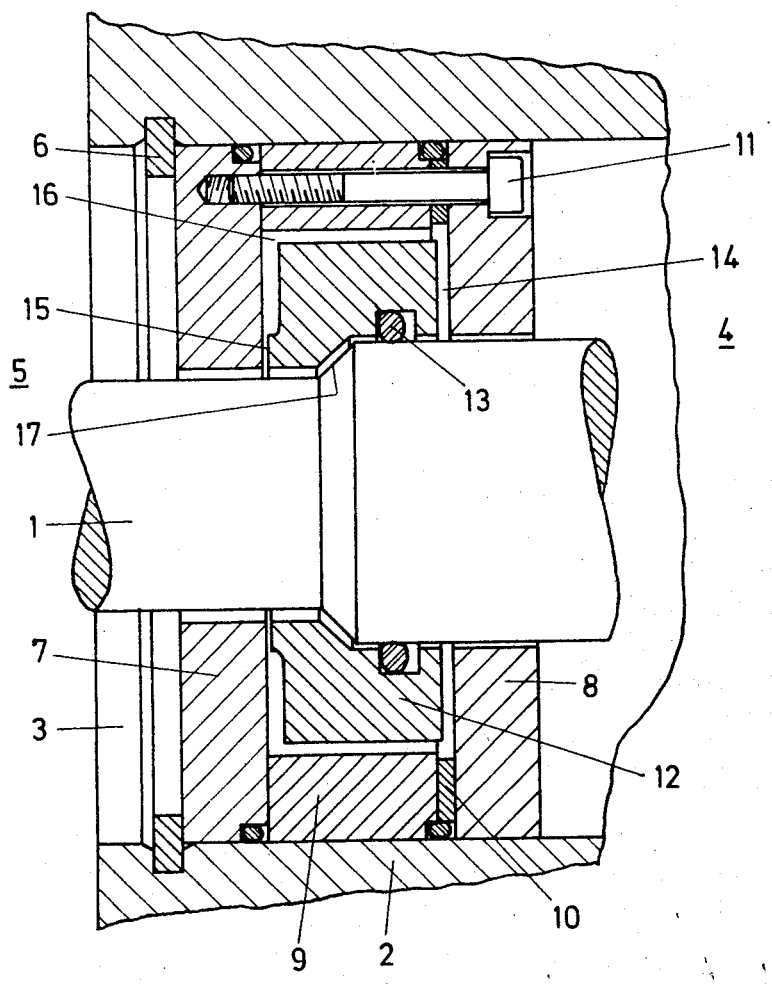
FIG. 1 is an axial sectional view of one form of floating annular seal means of this invention.

In particular reference to FIG. 1, a shaft 1 extends through a hole or passage 3, in a housing 2, wherein, between a space 4 and a space 5, there exists a pressure differential resulting from a high-pressure fluid in space 4 and a low-pressure fluid in space 5. The seal proper consists of fixed casing parts, namely, seat plates 7, 8, a spacer sleeve 9 and a spacer plate 10, all of which parts are held together by bolts 11 or equivalent means. In the encased space is located a seal ring 12 which is connected with the shaft 1 by an elastic seal 13 in such a manner that it can transmit torque and at the same time seal, wherein the elastic seal 13 permits a slight axial displacement and wobble of the seal ring 12. Thereby two operating choke gaps are created between the seal ring 12 and the seat plates 7, 8, namely, the gap 14 on the high pressure side and the gap 15 on the leak or low pressure side, which form the inlet and discharge, respectively, of an intermediate pressure space 16.

The functioning of the arrangement can be described as follows: The operating choke gaps 14 and 15 form a pressure divider, the intermediate pressure of which acts, due to a reduction 17 in shaft diameter, on a larger area than does the operating pressure opposing it according to the arrangement. Thereby a force equilibrium between the operating pressure force and the intermediate pressure force becomes possible for a certain axial position of the seal ring 12.

If the seal ring 12 is pushed out of this equilibrium position against the seat plate 7, a pressure increase is generated in the intermediate pressure space 16 by the closing of the operating choke gap 15, on the leak side, and the opening of the operating choke gap 14, on the pressure side, in such a manner that a force opposing the disturbance is generated and the seal ring 12 is pushed back into the equilibrium position. In case of an excursion in the other direction, the same mechanism likewise returns the seal ring to the same position. The equilibrium position is therefore a stable rest point of the system.

In the embodiment of FIG. 1, the required axial clearance of the seal ring 12 in the casing is a few hundredths of a millimeter and it can therefore become difficult to keep this clearance merely through the dimensional tolerances at the spacer sleeve 9 and the seal ring piston-valve member 12. This difficulty can be circumvented substantially by joint plane-parallel lapping or grinding of the seal-ring 12 and the spacer sleeve 9, the clearance being determined by the spacer plate 10.

Figure 2:
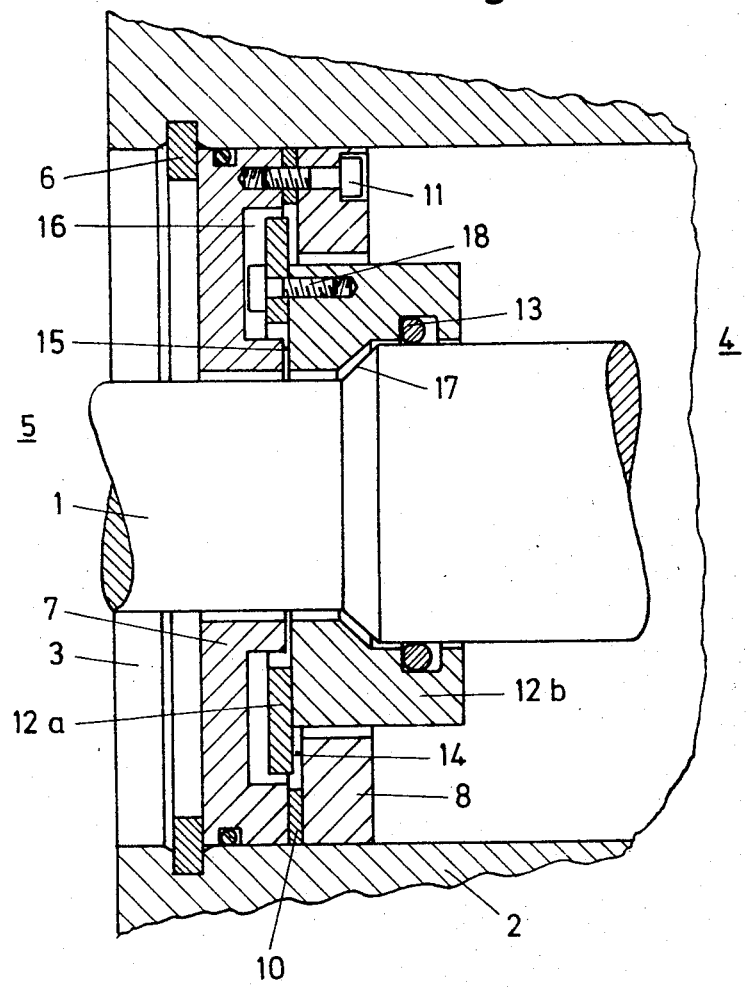
FIG. 2 is an axial sectional view of another embodiment of the inventive floating annular seal means.

Alternatively and/or in conjunction therewith, another possibility of substantially circumventing the difficulty is illustrated in the embodiment of FIG. 2. In this embodiment shaft 1 again extends through hole 3 in housing 2, whereby there exists between the high-pressure space 4 and the low-pressure space 5 a pressure differential, the leakage flow of which is reduced to a minimum amount by the seal which is inserted in the hole 3 and is secured by a lock ring 6. The floating seal means again consists of stationary casing parts, namely, seat plates 7 and 8, and a spacer plate 10, all of which parts are held together by bolts, such as 11 or equivalent means, and a two part seal ring 12a, 12b which parts are enclosed by the casing parts and connected with the shaft 1 by way of the elastic-seal isolating member 13 so that the seal can transmit torques and at the same time seal. The elastic-seal isolating member 13 permits a slight axial displacement and wobble of the seal ring 12a and 12b. The axial clearance of the seal ring 12a, 12b, between the chamber casing parts 7 and 8, is determined by the spacer plate 10.

Figure 4:
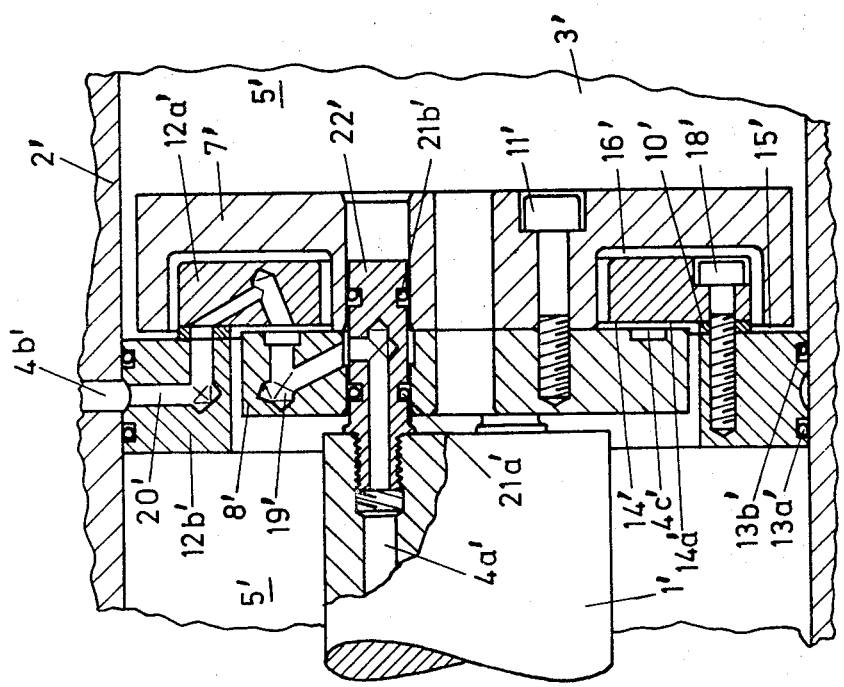
FIGS. 3 and 4 are axial sectional views of shaft seal means embodying the invention, and serving as pressure medium feedthroughs.
Figure 3:
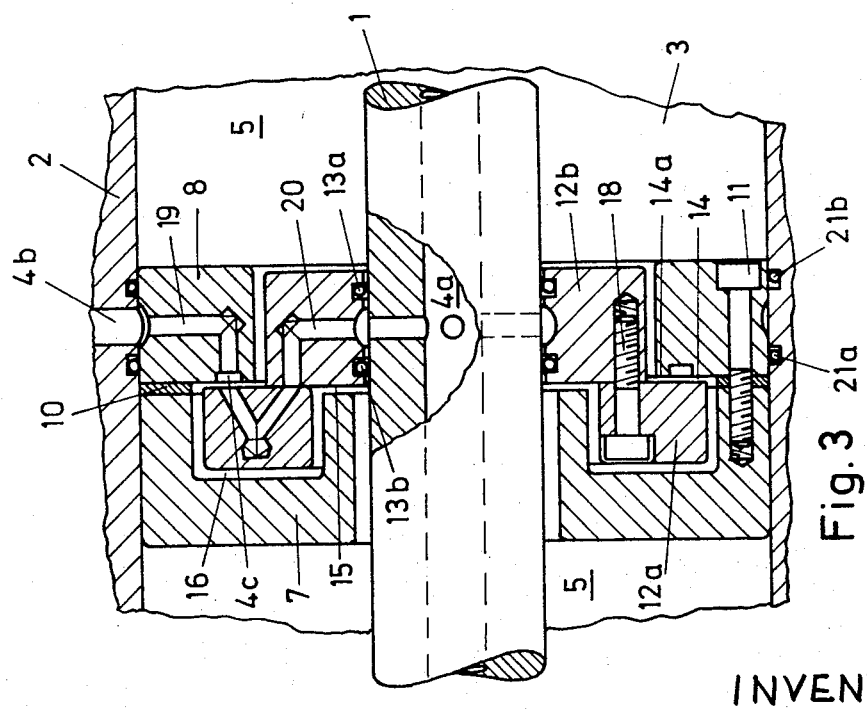

In FIGs. 3 and 4, two illustrative embodiments of the floating shaft seal means according to the invention are shown, each of which is derived from the basic embodiment illustrated in FIG. 2 and is designed as a pressure-medium feed through structure.

A high-pressure space 4a in a rotating shaft 1 in FIG. 3 is to be put in connection with a high-pressure space 4b in housing 2, wherein a discharge of the medium which is subject to the operating pressure of the spaces 4a–4b discharging into the low-pressure spaces 5, which are formed between the shaft 1 and the housing 2, is reduced to the minimum while concurrently being maintained sufficiently to serve as a cushion and choke. This is achieved by the hydrostatic seal means of this invention which is inserted between the shaft 1 and the housing 2 and which modified to constitute a feed through. The feed through consists in turn of the stationary chamber casing parts, namely the seat plates 7 and 8, and a spacer plate 10, all of which parts are held by bolts such as 11, or equivalent means, and of two-part seal ring 12a, 12b which is enclosed by the casing parts and which is connected with the shaft 1 by way of the respective elastic-seal isolating means 13 a and 13b so that the seal ring transmits torque and at the same time seals the high-pressure fluid preventing leakage thereof along the shaft into the low-pressure space 5. The elastic-seal isolating members 13a and 13b allow a slight axial displacement and wobble of the seal-ring piston-valve member 12a, 12b. Between each part 12a and 12b of the seal-ring piston-valve member and one of each seat plate 7 and 8, two operating choke gaps are created. These gaps are the gap 14 on the pressure side and the gap 15 on the leak side, which form the inlet and discharge, respectively, of an intermediate pressure space 16. Between the seat plate 8 and the seal ring 12 is further formed an additional pressure area limiting gap 14a, whereby the pressure space facing the seal ring is confined to the annular slot 4c. The parts 12a and 12b of the seal ring are held together by bolts 18 or equivalent means.

The operation of the arrangement according to FIG. 3 can be described as follows: The operating choke gaps 14 and 15 form a pressure divider, the intermediate pressure of which acts upon a larger area than does the operating pressure opposing it as a result of the pressure area limiting gap 14a, according to the arrangement in the annular slot 4c, whereby an equilibrium of forces between the operating pressure force and the intermediate pressure force becomes possible for a defined axial position of the seal ring piston-valve member 12.

If the seal ring 12 is pushed out of this equilibrium position against the seat plate 7, a pressure increase is generated in intermediate pressure space 16 by the closing of the second port of the gap 15 on the leak side and the opening of the first port of the operating choke gap 14 on the pressure side in such a manner that a force opposed to the disturbance is generated and the seal ring 12 is pushed back into the equilibrium position. In case of an excursion in the other direction, the same mechanism likewise returns the seal ring into the same position, the second port being opened while pressure drop over the closing first port causes the return of the seal ring to the equilibrium position, i.e., to the stable rest point of the system, wherein the pressure area limiting gap 14 does not participate in the control loop.

The main fluid flow, subject to the operating pressure, is conducted from the shaft hole 4a by way of a hole 20 in the seal ring 12a, 12b to the annular slot 4c, and is fed through a hole 19 in the seat plate 8 to its utilization point in the housing space 4b. This flow direction can, of course, be reversed. In FIG. 3, tightness is assured at the junction points shaft-feed through and feed through-housing by elastic seals 13a, 13b, and 21a, 21b, respectively.

If axial displacements of the shaft 1 occur relative to the housing 2, the friction force of the elastic seal is frequently too large and influences the control mechanism of the seal accordingly. In order to remove this source of trouble, so-called banjo lead-ins of the operating medium can be used, as is shown in FIG. 4, where the corresponding parts are designated by the same reference character primed. For design reasons it is more advantageous here if the feed through is operated in the reverse direction. However, the mechanism of operation remains the same, the sole difference being merely the arrangement of parts. Seat plates 7' and 8' rotate with shaft 1', and seal rings 12a' and 12b' remain stationary relative to housing 2'. The elastic seals 21a' and 21b' are much smaller than the corresponding seals in FIG. 3 and generate substantially smaller friction forces, as compared to the control forces which remain the same. Furthermore, the banjo pins 22' constitute an automatic means for taking along this seal.

The remaining parts of the feed through remain functionally the same and accordingly are labeled the same as in FIG. 3. In FIG. 4 the spacer sheet 10' is now located between the seal rings 12a' and 12b' of the chamber means casing.

In an obviously similar manner, the embodiment of FIG. 1 may be modified to a similar type feed through embodiment the same as FIG. 2 is altered to the embodiments of FIGS. 3 or 4. In such a modification of the FIG. 1 embodiment, the pressure area limiting gap 14a of FIG. 3 is then provided in the plane of the operating gap 14 on the pressure side in FIG. 1, and is separated from the latter pressure side by a corresponding annular slot 4c of FIG. 3. In addition, corresponding holes 19, 20 (of FIG. 3) as well as the isolating seal means 13a for the pressure medium must, of course, be provided.

It is to be understood that the illustrative embodiments and examples given in this disclosure are merely by way of illustration and are not intended to restrict the scope of the disclosed invention, it being within the scope of the invention to employ obvious equivalence and substitutes as would be apparent to a person of skill in this particular art.

What is claimed is:

1. A hydrostatic shaft seal for an axially extending shaft disposed within an opening in a housing with said shaft spaced within the opening radially inwardly from said housing, said shaft and said housing being relatively rotatable, said shaft seal being subjected to operating hydraulic pressures and including seal ring means substantially enclosed within said opening by said housing, seat plate means positioned within the opening in said housing and cooperating with said seal ring means with said seat plate means comprising a pair of annular seat plates, means for maintaining one of said seal ring means and said pair of seat plates in fixed rotary position relative to said shaft permitting relative axial displacement thereof on said shaft, said seal ring means having a pair of annular sealing faces directed in opposite axial directions of said shaft and each sealing face defining with a respective face of a different one of said pair of annular seat plates a first choke gap and a second choke gap respectively, said first choke gap arranged to be subjected to a higher hydraulic operating pressure than the hydraulic operating pressure to which said second gap is subjected, and said seal ring means cooperating with said seat plate means and forming a passage for connecting said first and second choke gaps in series with each other so that said first and second choke gaps open and close in opposition, the improvement including said seal ring means comprising two annular seal rings fixedly joined together with one said annular seal ring extending radially outwardly beyond the other said annular seal ring and the other said annular seal ring extending radially inwardly from the one said annular seal ring, said seal rings being juxtaposed to each other and said annular sealing faces extending in a common plane, one face of one of said seal rings extending transversely of the axial direction of said shaft and facing in one axial direction of said shaft and defining one of said annular sealing faces, and one of the other of said shaft and facing in the opposite axial direction of said shaft and defining the other said annular sealing face so that said first and second gaps lie in a common plane, and a spacer plate providing a clearance between one of said pair of seal rings and said pair of seat plates.

2. A hydrostatic shaft seal, as set forth in claim 1, wherein said spacer plate is interposed in the axial direction of said shaft between said seat plates.

3. A hydrostatic shaft seal, as set forth in claim 1, wherein said spacer plate is interposed in the axial direction of said shaft between said seal rings.

4. A hydrostatic shaft seal, as set forth in claim 1, wherein said means for permitting relative axial displacement includes elastic seal elements.

5. A hydrostatic shaft seal, as set forth in claim 1, wherein said seal ring means and said seat plate means combined to form a passage providing for feedthrough of said hydraulic pressure medium from said housing to said shaft, said seal ring means and said seat plate means further forming a third choke gap, said third choke gap serving as a pressure area limiting gap and located in the common plane of said first and second choke gaps and an annular slot-shaped pressure space separating said third choke gap from the adjacent first choke gap, and further forming pressure medium lines connecting said slot-shaped space with said shaft and said housing.

6. A hydrostatic shaft seal, as set forth in claim 5, including banjo feed means providing for feedthrough of said hydraulic pressure medium from one of said pairs of seal rings and said pairs of seat plates to said shaft thereby permitting axial displacement of one of said pair of seal rings and said pair of seal seat plates on said shaft under low friction forces.

* * * * *